UNITED STATES PATENT OFFICE.

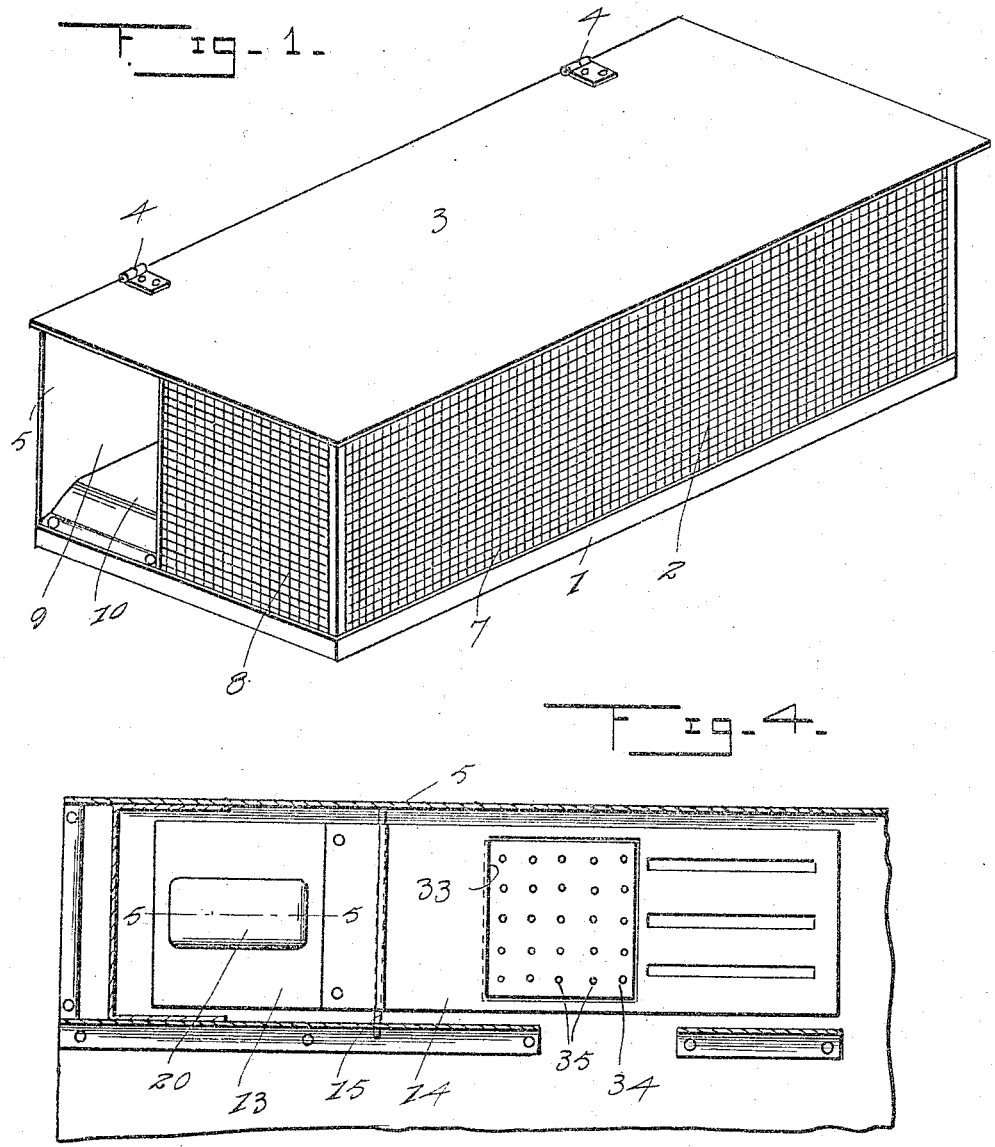

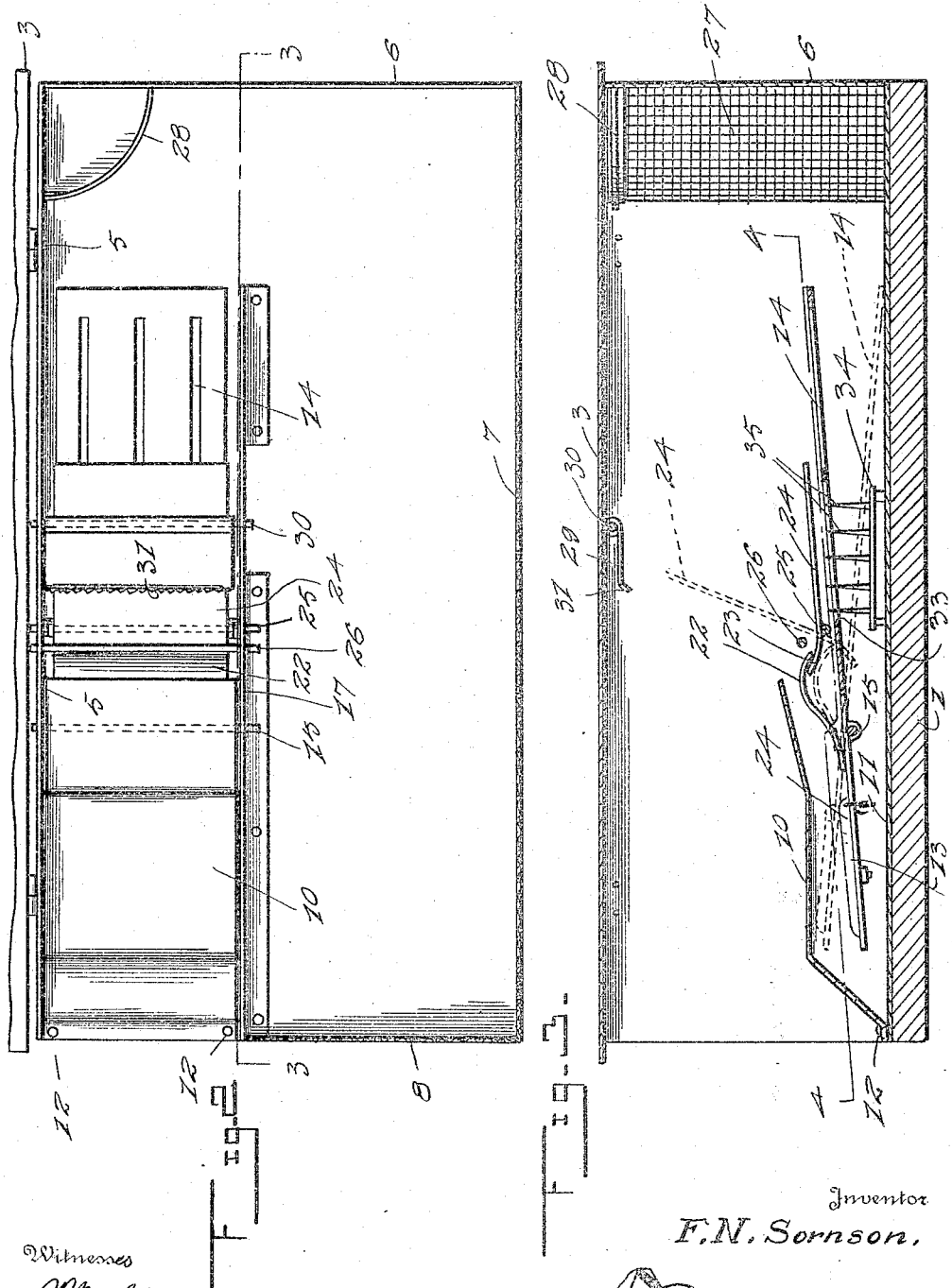

FRANK N. SORNSON, OF SUMNER, IOWA.

TRAP.

1,197,561. Specification of Letters Patent. Patented Sept. 5, 1916.

Application filed April 12, 1916. Serial No. 90,592.

*To all whom it may concern:*

Be it known that I, FRANK N. SORNSON, a citizen of the United States, residing at Sumner, in the county of Bremer and State of Iowa, have invented certain new and useful Improvements in Traps; and I do hereby declare the following to be a full, clear, and exact description of the invention, such as will enable others skilled in the art to which it appertains to make and use the same.

This invention relates to a trap for catching rats, mice, game or fur bearing animals and the primary object of the invention is to provide an open door trap, which is constructed so that the door will close and prevent an animal that has previously entered the trap from escaping, the door being closed in front of the animal by its weight, when it attempts to leave the trap.

A further object of this invention is to provide a trap as specified, wherein the door is normally held in an open position, and is controlled by a pivotally mounted door operating member, one end of which is weighted, and which member is positioned so that an animal entering or leaving the trap must first tread upon it, which will operate it and close the door, preventing the escape of an animal from the trap, or closing the door behind an animal that has entered the trap.

A still further object of this invention is to provide a door operating pivoted member as specified one end of which has a weight adjustably connected thereto, so that the position of the weight may be adjusted as desired, to correspond with the weight of the animal to be caught.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a perspective view of the improved trap. Fig. 2 is a top plan view of the trap showing the hinged cover in an open position. Fig. 3 is a section on the line 3—3 of Fig. 2. Fig. 4 is a horizontal section on the line 4—4 of Fig. 3, and Fig. 5 is a section on the line 5—5 of Fig. 4.

Referring more particularly to the drawings, 1 designates the base of the improved trap, and 2 the main body of the trap.

3 indicates a door or cover which is hingedly connected as shown at 4 to one side of the trap body 2 and forms a closure for the top of the trap.

One side, namely the side 5 and the end 6 of the trap are constructed of sheet metal, wood or analogous material, while the side 7 and the end 8 are constructed of foraminous material or woven screen.

The end 8 of the body of the trap is provided with an opening 9, which communicates with the interior of the trap. A tread plate 10 is attached to the bottom 11 of the trap as shown at 12 and it extends inwardly from the opening 9, forming a cover for the weighted end 13 of the pivoted door operating plate 14. The pivoted door operating plate 14 is pivotally mounted upon a rod 15, which extends transversely across a portion of the interior of the trap and has one end seated in the side 5 of the trap and the other end journaled in the upstanding portion of an angled plate 17.

The weighted end 13 of the door operating member 14 is provided with a longitudinally extending slot 18, through which a bolt 19 extends. The bolt or pin 19 is formed upon a weight 20, and it has a nut 21 mounted thereon, for holding the bolt in various adjusted positions within the slot 18, for adjusting the position of the weight 20 with respect to the pivot 15 of the plate 14, for regulating the weight necessary for tilting the door operating plate.

The plate 14 has a plate 22 attached to its upper surface, which is curved, as clearly shown in Fig. 3 of the drawings. The free edge of the curved plate 22 engages the lower curved end 23 of the door 24. The door 24 is attached to a rod 25, which rod is rockably carried by the side 5 of the body of the trap, and the vertical portion of the angle bracket or plate 17. A rod 26 extends transversely across the trap and is provided for limiting the upward movement of the door 24.

A bait holder 27, which is constructed of wire mesh work or suitable foraminous material is positioned in the inner corner of the trap directly in front of the opening 9, so that an animal entering the trap may readily see and scent the bait. The bait receptacle 27 has a door 28 upon its upper end, which may be either slidably or hingedly connected to the bait receptacle, as desired, and which door is provided for facilitating the insertion into or removal from the receptacle.

A spurred plate 29 is carried by a rod 30. The rod 30 is supported by the side 5 and the vertical portion of the angle plate 17 adjacent the upper edges of the same. The forward edge of the plate 29 is curved downwardly as shown at 31 and serrated for forming spurs for engaging an animal.

The pivoted door operating member 14 is provided with a rectangular opening 33, beneath which is positioned a platform 34. The platform 34 has a plurality of pointed spurs 35 attached thereto as clearly shown in Figs. 3 and 4 of the drawings.

After the bait has been properly placed within the bait receiving receptacle 27, and an animal is attracted thereby, the animal must enter the trap through the opening 9, and pass over the tread 10. From the tread 10, the animal will pass over the door 24 which is normally in an open position as indicated in solid lines in Fig. 3, and from the door tread upon the end of the pivoted door operating plate 14. When the animal treads upon the end of the pivoted door operating plate 14, its weight will overcome the weight 20, and consequently rock the plate 14 which will through the engagement between the curved plate 22 and the curved end 23 of the door 24 swing the door into a closed position as indicated in dotted lines in Fig. 3 of the drawings, behind the animal entering the trap. Should the animal endeavor to escape from the trap, after it has entered the same, it must tread upon the end of the pivoted door operating member 14, which will cause the door 24 to move upwardly into a closed position in front of the animal and prevent its escape. The spurs 35 will prevent the animal from tampering with the door 24 when it is closed.

The weight 20, will normally hold the door operating plate 14 in a position which will hold the door 24 open, to permit the animal to enter therein so that more than one animal may be caught within the trap at a single setting.

What is claimed is:—

In a trap structure, a body having an opening formed in one end of the same, an upstanding plate positioned within said trap and forming a passage way therein, a bait receiving receptacle positioned interiorly of said trap and in alinement with said opening, a door carried by said trap and normally lying in an opened position, a weighted pivotally mounted door operating plate positioned within said passage way and in the path of an animal entering the trap, and means carried by said door operating plate for moving said door into a closed position rearwardly of an animal entering the trap or in front of an animal endeavoring to leave the trap, a weight adjustably carried by one end of said weighted pivoted door operating plate and adapted for movement toward or from the pivotal point of the plate, said door operating plate being provided with an opening formed therein, and a plurality of sharpened spurs positioned beneath said opening.

In testimony whereof I affix my signature in presence of two witnesses.

FRANK N. SORNSON.

Witnesses:
R. D. McCook,
Elmer Mohling.

Copies of this patent may be obtained for five cents each, by addressing the "Commissioner of Patents, Washington, D. C."